(12) United States Patent
Won et al.

(10) Patent No.: US 11,508,973 B2
(45) Date of Patent: Nov. 22, 2022

(54) FUEL CELL SYSTEM FOR VEHICLE

(71) Applicant: HYUNDAI MOBIS CO., LTD., Seoul (KR)

(72) Inventors: Jong Bo Won, Yongin-si (KR); Sung Kyung Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/316,948

(22) Filed: May 11, 2021

(65) Prior Publication Data

US 2021/0399317 A1    Dec. 23, 2021

(30) Foreign Application Priority Data

Jun. 19, 2020    (KR) .................. 10-2020-0075124

(51) Int. Cl.
*H01M 8/04029*    (2016.01)
*H01M 8/24*    (2016.01)

(52) U.S. Cl.
CPC ......... *H01M 8/04029* (2013.01); *H01M 8/24* (2013.01); *H01M 2250/20* (2013.01)

(58) Field of Classification Search
CPC .................................................. H01M 8/04029
See application file for complete search history.

(56) References Cited

U.S. PATENT DOCUMENTS

| | | | |
|---|---|---|---|
| 2002/0160246 A1* | 10/2002 | Walsh ............... | H01M 8/04074 165/177 |
| 2005/0279113 A1* | 12/2005 | Hoshi ............... | H01M 8/04029 62/509 |
| 2022/0029182 A1* | 1/2022 | Li ..................... | H01M 8/04701 |

* cited by examiner

*Primary Examiner* — Brian R Ohara
(74) *Attorney, Agent, or Firm* — NSIP Law

(57) ABSTRACT

A fuel cell system for a vehicle includes: a first cooling line to pass through a fuel cell stack in the vehicle and to circulate a first coolant therethrough; a second cooling line to pass through a power electronic part in the vehicle and to circulate a second coolant therethrough; and a heat exchanger to allow the first coolant and the second coolant to exchange heat.

9 Claims, 5 Drawing Sheets

FUEL CELL SYSTEM FOR VEHICLE

CROSS-REFERENCE TO RELATED APPLICATION

This application claims priority to and the benefit of Korean Patent Application No. 10-2020-0075124 filed in the Korean Intellectual Property Office on Jun. 19, 2020, the entire contents of which are incorporated herein by reference.

TECHNICAL FIELD

The present disclosure relates to a fuel cell system for a vehicle, and more particularly, to a fuel cell system for a vehicle, which is capable of ensuring a high output from a fuel cell stack and improving safety and reliability.

BACKGROUND ART

A fuel cell system refers to a system that produces electrical energy by means of a chemical reaction of fuel. Research and development are consistently performed on the fuel cell system as an alternative capable of solving global environmental issues.

Based on types of electrolytes used for the fuel cell system, the fuel cell system may be classified into a phosphoric acid fuel cell (PAFC), a molten carbonate fuel cell (MCFC), a solid oxide fuel cell (SOFC), a polymer electrolyte membrane fuel cell (PEMFC), an alkaline fuel cell (AFC), a direct methanol fuel cell (DMFC), and the like. Based on operating temperatures, output ranges, and the like as well as types of used fuel, the fuel cell systems may be applied to various application fields related to mobile power, transportation, distributed power generation, and the like.

The fuel cell system includes a fuel cell stack configured to generate electrical energy, a fuel supply device configured to supply fuel (hydrogen) to the fuel cell stack, an air supply device configured to supply oxygen in air which is an oxidant required for an electrochemical reaction in the fuel cell stack, and a thermal management system (TMS) configured to remove reaction heat in the fuel cell stack out of the system, control an operating temperature of the fuel cell stack, and perform a function of managing water.

The thermal management system (TMS) refers to a kind of cooling device that maintains an appropriate temperature (e.g., 60 to 70° C.) by circulating an anti-freezing liquid, which serves as a coolant, to the fuel cell stack. The thermal management system may include a TMS line in which a coolant for cooling the fuel cell stack is circulated, a reservoir in which the coolant is stored, a pump configured to circulate the coolant, an ion filter configured to remove ions contained in the coolant, and a radiator configured to radiate heat of the coolant to the outside. In addition, the thermal management system may include a heater configured to heat the coolant, and an air conditioning unit (e.g., a heating heater) configured to cool and heat an interior of a vehicle by using the coolant.

Meanwhile, recently, various attempts have been made to apply the fuel cell system to construction machines as well as passenger vehicles (or commercial vehicles).

The passenger vehicle requires a high output from the fuel cell stack while traveling and may cool the fuel cell stack by the radiator using vehicle-induced wind generated in accordance with a vehicle speed.

In contrast, because the construction machine performs work (e.g., leveling or loading) while the construction machine is stationary, a high output is required from the fuel cell stack while the construction machine is stationary. However, there is a problem in that it is difficult to sufficiently cool the fuel cell stack only with the amount of air flow generated by a cooling fan, which causes a deterioration in safety and durability of the fuel cell stack.

Therefore, recently, various types of research are conducted to effectively cool a fuel cell stack in a situation in which a high output is required from the fuel cell stack while a vehicle is stationary, but the research result is still insufficient. Accordingly, there is a need for development of a fuel cell system capable of effectively cooling the fuel cell stack in the above-mentioned situation.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, a fuel cell system for a vehicle includes: a first cooling line configured to pass through a fuel cell stack in the vehicle and to circulate a first coolant therethrough; a second cooling line configured to pass through a power electronic part in the vehicle and to circulate a second coolant therethrough; and a heat exchanger configured to allow the first coolant and the second coolant to exchange heat.

The fuel cell system may include a first radiator disposed along the first cooling line and configured to cool the first coolant; and a second radiator disposed along the second cooling line and configured to cool the second coolant.

The heat exchanger may be connected to the first cooling line between an outlet of the first radiator and the fuel cell stack, and the heat exchanger may be connected to the second cooling line between an outlet of the second radiator and the power electronic part.

The heat exchanger may be connected to the first radiator, and the heat exchanger may be connected to the second cooling line between an outlet of the second radiator and the power electronic part.

The first radiator may include a first tube that defines a first flow path in which the first coolant flows, the heat exchanger may include a second tube disposed along the first flow path to exchange heat with the first coolant, and the second coolant may exchange heat with the first coolant in the first flow path while the second coolant flows along the second tube.

The second tube may define a second flow path in which the second coolant flows, and at least a part of the second tube may be exposed to the first coolant in the first flow path.

The fuel cell system may include a sealing member disposed between the first tube and the second tube.

The first radiator may be disposed in parallel with the second radiator, and the fuel cell system may include a cooling fan configured to blow outside air to the first radiator and to the second radiator.

A first temperature of the first coolant that has passed through the first radiator may be higher than a second temperature of the second coolant that has passed through the second radiator, and a third temperature of the first coolant that has passed through the heat exchanger may be lower than the first temperature.

The fuel cell system may include: a first connection line including one end connected to the first cooling line between an outlet of the first radiator and an inlet of the fuel cell stack, and a second end connected to the first cooling line between an outlet of the fuel cell stack and an inlet of the first radiator; a heater disposed along the first connection line and configured to heat the first coolant flowing along the first connection line; and a second connection line configured to pass through an air conditioning unit in the vehicle and to circulate the first coolant therethrough, the second connection line being connected to the first cooling line between the outlet of the first radiator and the inlet of the fuel cell stack.

The power electronic part may include at least one of a bi-directional high-voltage DC-DC converter (BHDC) disposed between the fuel cell stack and a high-voltage battery of the vehicle, a blower pump control unit (BPCU) configured to control a blower configured to supply outside air for operating the fuel cell stack, a low-voltage DC-DC converter (LDC) configured to convert a high direct-current voltage, which is supplied from the high-voltage battery, into a low direct-current voltage, an air compressor (ACP) configured to compress air to be supplied to the fuel cell stack, and an air cooler.

Other features and aspects will be apparent from the following detailed description, the drawings, and the claims.

DETAILED DESCRIPTION

Figure 1:
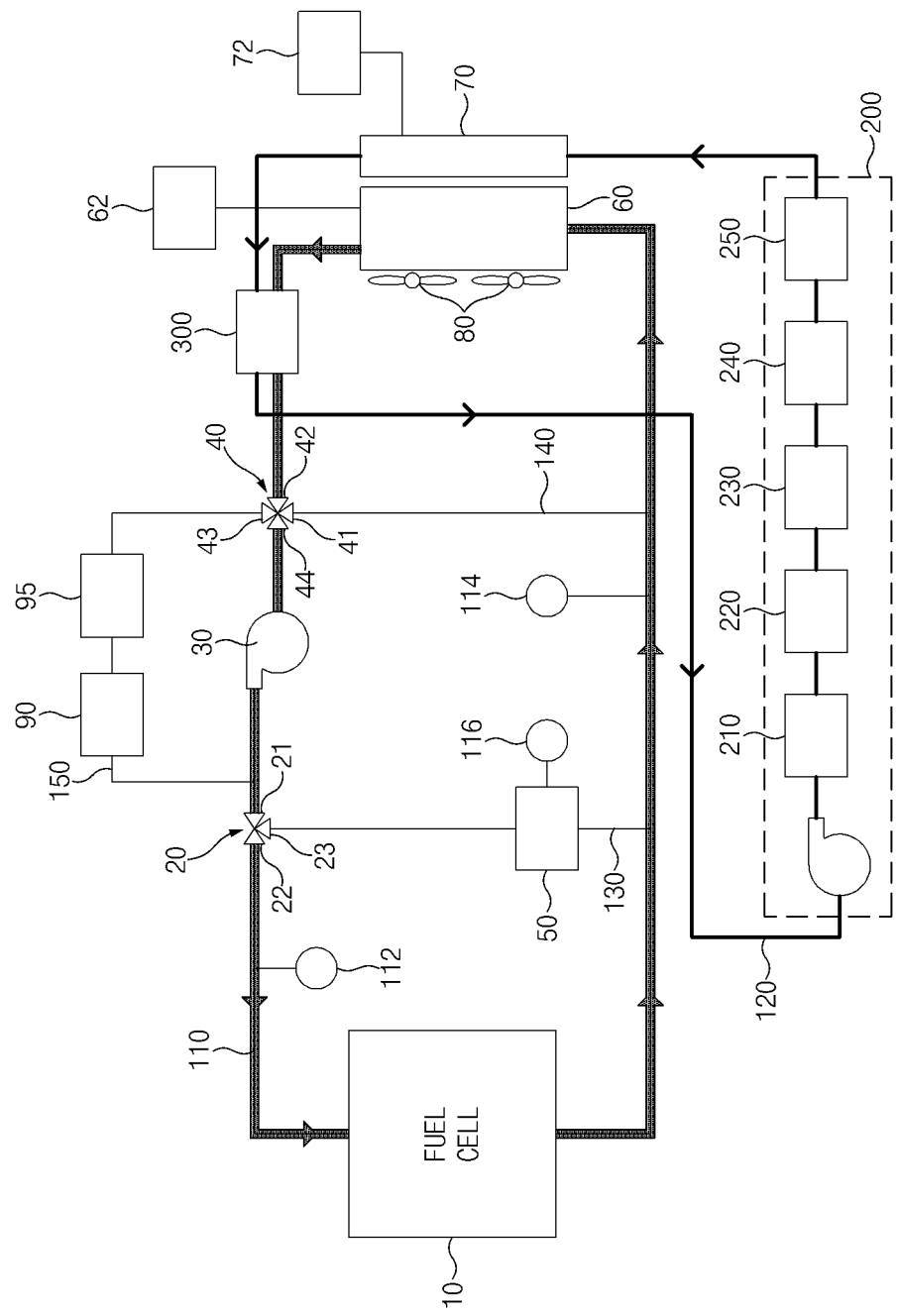
FIG. 1 is a view for explaining a fuel cell system for a vehicle according to the present disclosure.
Figure 2:
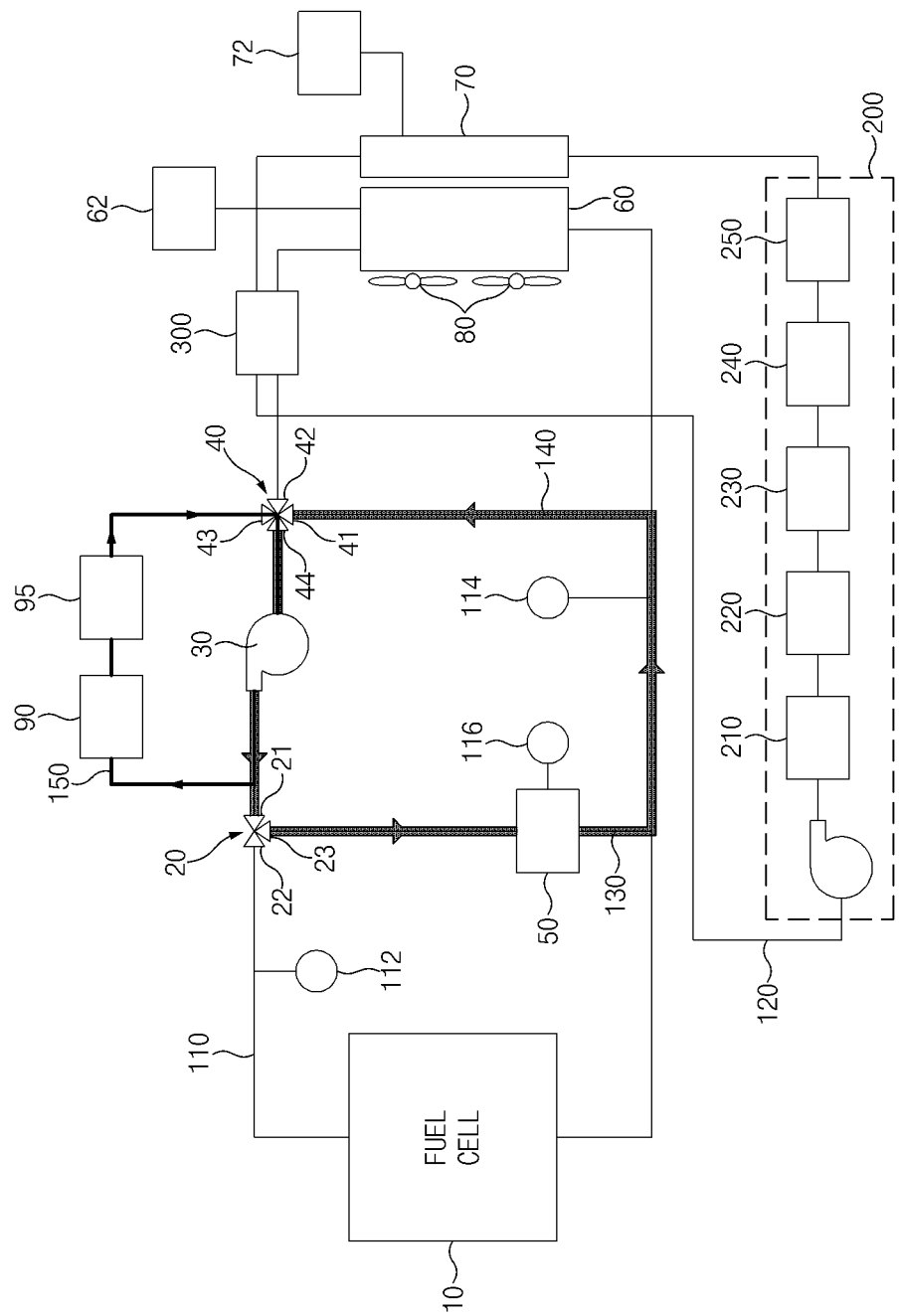
FIG. 2 is a view for explaining a flow of a coolant along a first connection line and a second connection line in the fuel cell system for a vehicle according to the present disclosure.

Hereinafter, embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiment of the present disclosure are for explaining the embodiments, not for limiting the present disclosure.

Unless particularly stated otherwise in the context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "above (on) or below (under)" may include a meaning of a downward direction as well as an upward direction based on one constituent element.

Referring to FIGS. 1 to 5, a fuel cell system for a vehicle according to the embodiment of the present disclosure includes a first cooling line 110 configured to pass through a fuel cell stack 10 in a vehicle and allow a first coolant to circulate therethrough, a second cooling line 120 configured to pass through power electronic parts 200 in the vehicle and allow a second coolant to circulate therethrough, and a heat exchanger 300 configured to allow the first coolant and the second coolant to exchange heat.

For reference, in the embodiment of the present disclosure, the first cooling line 110 and the second cooling line 120 may constitute a TMS line in which the coolants (the first coolant and the second coolant) may flow while performing heat exchange. The coolant may be used as a cooling medium or a heating medium in the TMS line.

The first cooling line 110 is configured to pass through the fuel cell stack 10, and the first coolant circulates along the first cooling line 110.

The first cooling line 110 is configured to define a cooling loop for cooling the first coolant or a heating loop for heating (raising a temperature of) the first coolant depending on a state of the vehicle. As an example, the first cooling line 110 may be configured to define the heating loop in order to ensure a cold start ability in an initial start state and define the cooling loop in order to discharge heat generated in the fuel cell stack 10 to the outside while the vehicle travels.

For reference, the fuel cell stack 10 may have various structures capable of producing electricity by means of an oxidation-reduction reaction between fuel (e.g., hydrogen) and an oxidant (e.g., air).

For example, the fuel cell stack 10 includes: a membrane electrode assembly (MEA) (not illustrated) having catalyst electrode layers, in which electrochemical reactions occur, at both sides of an electrolyte membrane through which hydrogen ions move; a gas diffusion layer (GDL) (not illustrated) configured to uniformly distribute reactant gases and serve to transfer generated electrical energy; a gasket (not illustrated) and a fastener (not illustrated) configured to maintain leakproof sealability for the reactant gases and the coolant and maintain an appropriate fastening pressure; and a separator (bipolar plate) (not illustrated) configured to move the reactant gases and the coolant.

More specifically, in the fuel cell stack 10, hydrogen, which is fuel, and air (oxygen), which is an oxidant, are supplied to an anode and a cathode of the membrane electrode assembly, respectively, through flow paths in the separators, such that the hydrogen is supplied to the anode, and the air is supplied to the cathode.

The hydrogen supplied to the anode is decomposed into hydrogen ions (protons) and electrons by catalysts in the electrode layers provided at both sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons delivered through the separator meet oxygen in the air supplied to the cathode by an air supply device, thereby creating a reaction of producing water. As a result of the movement of the hydrogen ions, the electrons flow through external conductive wires, and an electric current is produced as a result of the flow of the electrons.

A first pump 30 configured to force the first coolant to flow is provided in the first cooling line 110.

A typical pumping means capable of pumping the first coolant may be used as the first pump 30, and the present disclosure is not restricted or limited by the type and the property of the first pump 30.

The fuel cell system according to the exemplary embodiment of the present disclosure may include a first connection line 130, and the first connection line 130 may define a heating loop (heating circulation route) for heating the first coolant in cooperation with the first cooling line 110.

More specifically, one end of the first connection line 130 is connected to the first cooling line 110 at a first point positioned between an outlet of the first pump 30 and the fuel cell stack 10, and the other end of the first connection line 130 is connected to the first cooling line 110 at a second point positioned between an inlet of the first pump 30 and the fuel cell stack 10.

In this case, the inlet of the first pump 30 is defined as an inlet through which the first coolant is introduced into the first pump 30. In addition, the outlet of the first pump 30 is defined as an outlet through which the first coolant having passed through the first pump 30 is discharged.

Further, the section between the outlet of the first pump 30 and the fuel cell stack 10 is defined as a section in which the first coolant discharged from the first pump 30 flows to a first coolant inlet port (not illustrated) of the fuel cell stack 10. In addition, the section between the inlet of the first pump 30 and the fuel cell stack 10 is defined as a section in which the first coolant discharged from a coolant discharge port (not illustrated) of the fuel cell stack 10 flows to the inlet of the first pump 30.

According to the exemplary embodiment of the present disclosure, a heater 50 may be provided in the first connection line 130, and the first coolant flowing along the first connection line 130 may be heated while passing through the heater 50.

In addition, a first valve 20 configured to switch a flow path of the first coolant to the heater 50 or the fuel cell stack 10 is provided in the first cooling line 110.

As an example, the first valve 20 is provided in the first cooling line 110 so as to be positioned at the first point, and one end of the first connection line 130 is connected to the first valve 20.

Various valve means capable of selectively switching the flow path of the first coolant to the heater 50 or the fuel cell stack 10 may be used as the first valve 20.

As an example, a typical three-way valve may be used as the first valve 20. More specifically, the first valve 20 includes a first port 21 connected to the first cooling line 110 so that the first coolant pumped by the first pump 30 is introduced into the first valve 20, a second port 22 connected to the first cooling line 110 so that the first coolant passing through the first valve 20 is introduced into the fuel cell stack 10, and a third port 23 connected to one end of the first connection line 130.

It is possible to selectively switch the flow path of the first coolant to the heater 50 or the fuel cell stack 10 by opening and closing the second port 22 and the third port 23 of the first valve 20. That is, when the second port 22 is opened and the third port 23 is closed, the first coolant passing through the first valve 20 is introduced into the fuel cell stack 10. On the contrary, when the third port 23 is opened and the second port 22 is closed, the first coolant passing through the first valve 20 is introduced into the heater 50 through the first connection line 130.

The fuel cell system according to the exemplary embodiment of the present disclosure may include a second connection line 150 connected to the first cooling line 110 and configured to define a cooling/heating loop for cooling and heating an air conditioning (HAVC) unit 90 in cooperation with the first cooling line 110.

As an example, the second connection line 150 may define a loop for heating a heating heater (not illustrated) of the air conditioning unit 90.

More specifically, the second connection line 150 is connected to the first cooling line 110 between the first point (the point at which one end of the first connection line 130 is connected to the first cooling line 110) and the outlet of the fuel cell stack 10, and the second connection line 150 is configured to allow a part of the first coolant to circulate therethrough.

In this case, the section between the first point and the outlet of the fuel cell stack 10 is defined as a section in which the first coolant discharged from the coolant discharge port (not illustrated) of the fuel cell stack 10 flows before passing through the first point.

As an example, one end of the second connection line 150 is connected to the first cooling line 110 between the first point and the inlet of the fuel cell stack 10, and the other end of the second connection line 150 is connected to the first cooling line 110 between the first pump 30 and the second point.

In addition, the second connection line 150 may be provided with an ion filter 95 configured to filter out ions contained in the first coolant that has passed through the air conditioning unit 90.

For reference, if electrical conductivity of the first coolant is increased due to corrosion, exudation, or the like of the system, electricity flows to the first coolant, which causes a problem in that the fuel cell stack 10 is short-circuited or electric current flows toward the first coolant. Therefore, low electrical conductivity of the first coolant needs to be maintained.

The ion filter 95 is configured to remove the ions contained in the first coolant in order to maintain the electrical conductivity of the first coolant to a predetermined level or lower.

As described above, according to the present disclosure, the first coolant also circulates along the second connection line 150 while circulating (along the heating loop) via the heater 50 in the first connection line 130 during the cold start in which the supply of the first coolant to the fuel cell stack 10 is cut off (the second port of the first valve is closed), and as a result, the ion filter 95 provided in the second connection line 150 may filter out (remove) the ions contained in the first coolant even during the cold start. Therefore, it is possible to obtain an advantageous effect of maintaining the electrical conductivity of the first coolant, which is introduced into the fuel cell stack 10 immediately after the cold start, to a predetermined level or lower.

In addition, in the exemplary embodiment of the present disclosure, the first cooling line 110 is configured to pass through a first radiator 60 between the first pump 30 and the outlet of the fuel cell stack 10, and the fuel cell system may include a third connection line 140 having one end connected to the first cooling line 110 at a front side of the first radiator 60, and the other end connected to the first cooling line 110 at a rear side of the first radiator 60.

Referring to FIG. 1, the third connection line 140 is connected to the first cooling line 110 and provided to define a cooling loop for cooling the first coolant in cooperation with the first cooling line 110. As an example, one end of the third connection line 140 may be connected to the first cooling line 110 between the first pump 30 and the first radiator 60, and the other end of the third connection line 140 may be connected to the first cooling line 110 between the coolant discharge port of the fuel cell stack 10 and the first radiator 60.

In addition, a second valve 40 configured to switch a flow path of the first coolant to the first radiator 60 or the fuel cell stack 10 is provided in the first cooling line 110.

As an example, the second valve 40 is provided in the first cooling line 110 so as to be positioned between the first pump 30 and the first radiator 60, and the second valve 40 is connected to one end of the third connection line 140 and an outlet end (the other end) of the second connection line 150.

Various valve means capable of selectively switching the flow path of the first coolant to the first radiator 60 or the fuel cell stack 10 may be used as the second valve 40.

As an example, a typical four-way valve may be used as the second valve 40. More specifically, the second valve 40 includes a first port 41 connected to the third connection line 140, a second port 42 connected to the first cooling line 110 so that the first coolant passing through the first radiator 60 is introduced into the second valve 40, a third port 43 connected to the other end of the third connection line 140, and a fourth port 44 connected to the first cooling line 110 so that the first coolant passing through the second valve 40 is introduced into the first pump 30.

It is possible to selectively switch the flow path of the first coolant to the first radiator 60 or the fuel cell stack 10 by opening and closing the first port 41 and the second port 42 of the second valve 40. That is, when the first port 41 is opened and the second port 42 is closed, the first coolant is introduced into the fuel cell stack 10 without passing through the first radiator 60. On the contrary, when the second port 42 is opened and the first port 41 is closed, the first coolant passes through the first radiator 60 and then enters the fuel cell stack 10.

The first radiator 60 is provided in the first cooling line 110 in order to cool the first coolant.

The first radiator 60 may have various structures capable of cooling the first coolant, and the present disclosure is not restricted or limited by the type and the structure of the first radiator 60.

Further, the first radiator 60 is connected to a first reservoir 62 configured to store the first coolant.

Meanwhile, the fuel cell system according to the exemplary embodiment of the present disclosure may include a first temperature sensor 112 configured to measure a temperature of the first coolant between the fuel cell stack 10 and the first point (the first valve), a second temperature sensor 114 configured to measure a temperature of the first coolant between the other end of the first connection line 130 and the first pump 30, and a third temperature sensor 116 configured to measure a temperature of the first coolant in the heater 50. An inflow rate of the first coolant to be introduced into the fuel cell stack 10 may be controlled based on the temperatures measured by the first temperature sensor 112, the second temperature sensor 114, and the third temperature sensor 116.

As an example, when a measured temperature of the first coolant circulating along the first cooling line 110 is lower than a predetermined target temperature, an inflow rate of the first coolant may be controlled to be lower than a predetermined flow rate. As described above, since the inflow rate of the first coolant to be introduced into the fuel cell stack 10 is controlled to be lower than the predetermined flow rate when the measured temperature of the first coolant is lower than the predetermined target temperature, it is possible to obtain an advantageous effect of minimizing a thermal shock and a deterioration in performance caused by a deviation in temperature of the first coolant (a temperature of the first coolant stagnating in the fuel cell stack 10 vs. a temperature of the first coolant to be introduced into the fuel cell stack 10).

The second cooling line 120 is configured to pass through the power electronic parts 200 in the vehicle, and the second coolant circulates along the second cooling line 120.

In this case, the power electronic parts 200 of the vehicle may be understood as components that use electric power of the vehicle as an energy source, and the present disclosure is not restricted or limited by the type and the number of power electronic parts 200 of the vehicle.

As an example, the power electronic parts 200 may include at least one of a bi-directional high-voltage DC-DC converter (BHDC) 210 provided between the fuel cell stack 10 and a high-voltage battery (not illustrated) of the vehicle, a blower pump control unit (BPCU) 220 configured to control a blower (not illustrated) configured to supply outside air for operating the fuel cell stack 10, a low-voltage DC-DC converter (LDC) 230 configured to convert a high direct-current voltage, which is supplied from the high-voltage battery, into a low direct-current voltage, an air compressor (ACP) 240 configured to compress air to be supplied to the fuel cell stack 10, and an air cooler 250.

A second pump (not illustrated) configured to force the second coolant to flow is provided in the second cooling line 120.

A typical pumping means capable of pumping the second coolant may be used as the second pump, and the present disclosure is not restricted or limited by the type and the property of the second pump.

In addition, a second radiator 70 configured to cool the second coolant is provided in the second cooling line 120.

The second radiator 70 may have various structures capable of cooling the second coolant, and the present disclosure is not restricted or limited by the type and the structure of the second radiator 70.

Further, the second radiator 70 may be connected to a second reservoir 72 configured to store the second coolant.

In particular, the first radiator 60 and the second radiator 70 are configured to be simultaneously cooled by a single cooling fan 80. As an example, the first radiator 60 and the second radiator 70 are disposed in parallel, and the cooling fan 80 is provided to blow outside air to the first radiator 60 and the second radiator 70.

As described above, since the first radiator 60 and the second radiator 70 are simultaneously cooled by the single cooling fan 80, it is possible to obtain an advantageous effect of simplifying the structure, improving a degree of design freedom and spatial utilization, and minimizing consumption of electric power required to cool the first radiator 60 and the second radiator 70.

The heat exchanger 300 is provided to allow the first coolant and the second coolant to exchange heat.

This is based on the fact that a temperature of the second coolant for cooling the power electronic parts is relatively lower than a temperature of the first coolant for cooling the fuel cell stack 10. Since the temperature of the first coolant may be lowered by allowing the first coolant and the second coolant to exchange heat without increasing a capacity of the first radiator 60 and a capacity of the cooling fan 80, it is possible to obtain an advantageous effect of improving efficiency in cooling the fuel cell stack 10 and improving safety and reliability.

In particular, the embodiment of the present disclosure may lower the temperature of the first coolant while a vehicle (e.g., a construction machine), which cannot use the vehicle-induced wind, is stationary, such that it is possible to obtain an advantageous effect of ensuring a high-output operation of the fuel cell stack 10 and improving safety and durability.

In particular, a first temperature of the first coolant having passed through the first radiator 60 is higher than a second temperature of the second coolant having passed through the second radiator 70, and a third temperature of the first coolant having passed through the heat exchanger 300 is lower than the first temperature.

For example, the first temperature of the first coolant may be higher by approximately 10° C. than the second temperature of the second coolant, and the third temperature of the first coolant having passed through the heat exchanger 300 (the first coolant having exchanged heat with the second coolant) may be lower by 1° C. than the first temperature.

The heat exchanger 300 may have various structures capable of allowing the first coolant and the second coolant to exchange heat, and the present disclosure is not restricted or limited by the type and the structure of the heat exchanger 300.

For example, referring to FIG. 1, the heat exchanger 300 may be connected to first cooling line 110 between an outlet of the first radiator 60 and the fuel cell stack 10, and the second cooling line 120 may connect an outlet of the second radiator 70 and the power electronic parts while passing through the heat exchanger 300.

For example, the first coolant may flow along the heat exchanger 300 connected to the first cooling line 110, and the second cooling line 120 may pass through the inside of the heat exchanger 300 so as to be exposed to the first coolant (e.g., so that the first coolant flows around the second cooling line 120). Since the first coolant and the second coolant exchange heat as described above, the temperature of the first coolant to be introduced into the fuel cell stack 10 may be lowered.

In the embodiment of the present disclosure illustrated and described above, the example in which the heat exchanger 300 is provided separately from the first radiator 60 has been described. However, according to another embodiment of the present disclosure, the heat exchanger may be connected directly to the first radiator.

Figure 3:
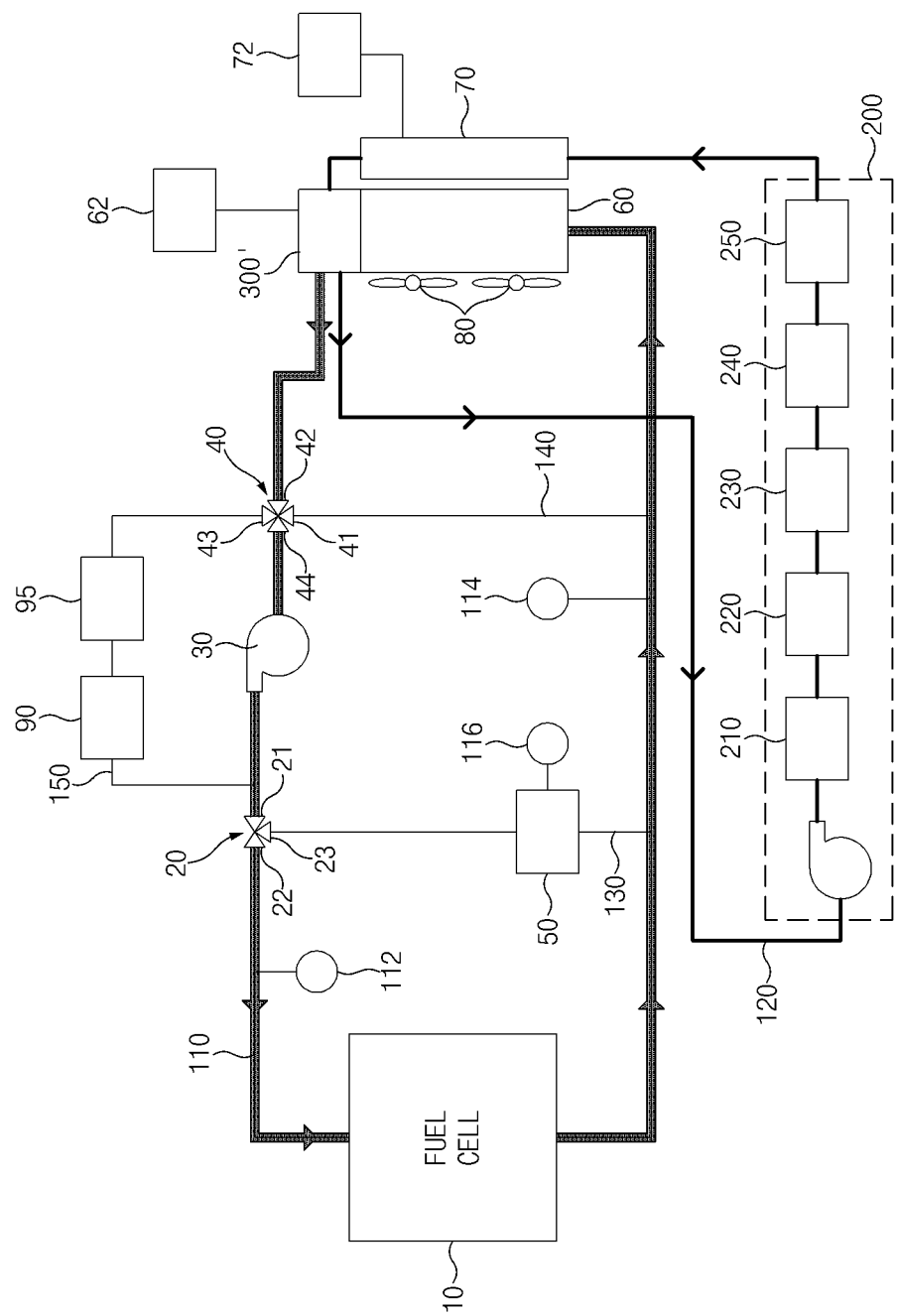
FIG. 3 is a view for explaining another embodiment of a heat exchanger in the fuel cell system for a vehicle according to the present disclosure.
Figure 4:
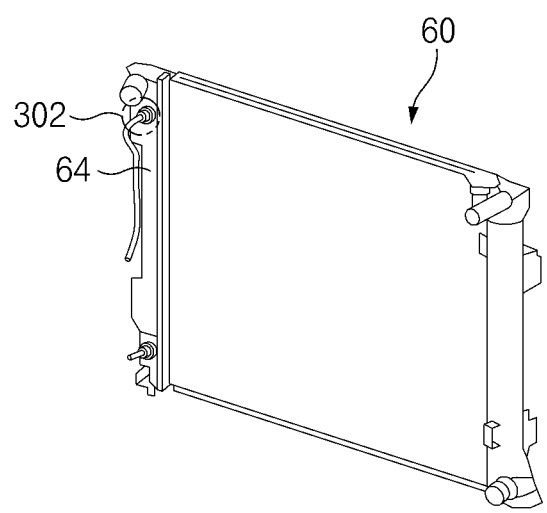
FIGS. 4 and 5 are views for explaining a first tube and a second tube in the fuel cell system for a vehicle according to the present disclosure.
Figure 5:
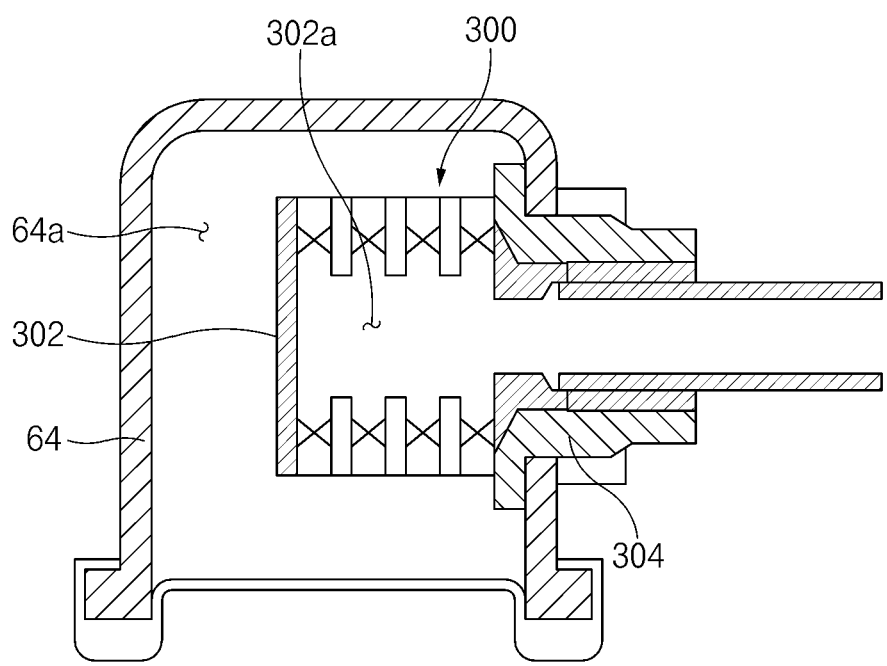

Referring to FIGS. 3 to 5, a fuel cell system for a vehicle according to another exemplary embodiment of the present disclosure includes the first cooling line 110, the second cooling line 120, and a heat exchanger 300'. The heat exchanger 300' may be connected to the first radiator 60, and the second cooling line 120 may connect the outlet of the second radiator 70 and the power electronic parts while passing through the heat exchanger 300'.

Further, the parts identical and equivalent to the parts in the above-mentioned configuration will be designated by the identical or equivalent reference numerals, and detailed descriptions thereof will be omitted.

The heat exchanger 300' may have various structures capable of being connected to the first radiator 60, and the present disclosure is not restricted or limited by the structure of the heat exchanger 300' and the connection structure.

Hereinafter, an example in which the heat exchanger 300' is connected to an approximately left upper end (based on FIG. 3) of the first radiator 60 will be described.

For example, the first radiator 60 includes a first tube 64 that defines a first flow path 64a in which the first coolant flows. The heat exchanger 300' includes a second tube 302 disposed in the first flow path 64a to exchange heat with the first coolant. The second coolant exchanges heat with the first coolant in the first flow path 64a while flowing along the second tube 302.

In particular, the second tube 302 defines a second flow path 302a in which the second coolant flows. At least a part of the second tube 302 is exposed to the first coolant in the first flow path 64a.

The shape and the structure of the second tube 302 may be variously changed in accordance with required conditions and design specifications, and the present disclosure is not restricted or limited by the shape and the structure of the second tube 302.

According to another embodiment of the present disclosure, heat radiating fins for increasing a contact area may be disposed on an outer surface of the second tube exposed to the first coolant in order to improve a cooling effect of the first coolant.

In particular, a sealing member 304 (made of rubber or silicone, for example) is provided between the first tube 64 and the second tube 302. Since the sealing member 304 is provided between the first tube 64 and the second tube 302 as described above, it is possible to obtain an advantageous effect of further stably maintaining the sealed state of the first flow path 64a.

While the embodiments have been described above, but the embodiments are just illustrative and not intended to limit the present disclosure. It can be appreciated by those skilled in the art that various modifications and alterations, which are not described above, may be made to the present embodiment without departing from the intrinsic features of the present embodiment. For example, the respective constituent elements specifically described in the embodiments may be modified and then carried out. Further, it should be interpreted that the differences related to the modifications and alterations are included in the scope of the present disclosure defined by the appended claims.

What is claimed is:

1. A fuel cell system for a vehicle, the fuel cell system comprising:
a first cooling line configured to pass through a fuel cell stack in the vehicle and to circulate a first coolant therethrough;
a second cooling line configured to pass through a power electronic part in the vehicle and to circulate a second coolant therethrough;
a heat exchanger configured to allow the first coolant and the second coolant to exchange heat;
a first radiator disposed along the first cooling line and configured to cool the first coolant; and
a second radiator disposed along the second cooling line and configured to cool the second coolant,
wherein the heat exchanger is connected to the first cooling line between an outlet of the first radiator and the fuel cell stack, and is connected to the second cooling line between an outlet of the second radiator and the power electronic part.

2. The fuel cell system of claim 1, wherein the heat exchanger is connected to the first radiator, and the heat exchanger is connected to the second cooling line between an outlet of the second radiator and the power electronic part.

3. The fuel cell system of claim 2, wherein the first radiator comprises a first tube that defines a first flow path in which the first coolant flows, the heat exchanger comprises a second tube disposed along the first flow path to exchange heat with the first coolant, and the second coolant exchanges heat with the first coolant in the first flow path while the second coolant flows along the second tube.

4. The fuel cell system of claim 3, wherein the second tube defines a second flow path in which the second coolant flows, and at least a part of the second tube is exposed to the first coolant in the first flow path.

5. The fuel cell system of claim 3, further comprising:
a sealing member disposed between the first tube and the second tube.

6. The fuel cell system of claim 1, wherein the first radiator is disposed in parallel with the second radiator, and the fuel cell system comprises a cooling fan configured to blow outside air to the first radiator and to the second radiator.

7. A fuel cell system for a vehicle, the fuel cell system comprising:
a first cooling line configured to pass through a fuel cell stack in the vehicle and to circulate a first coolant therethrough;
a second cooling line configured to pass through a power electronic part in the vehicle and to circulate a second coolant therethrough;
a heat exchanger configured to allow the first coolant and the second coolant to exchange heat;
a first radiator disposed along the first cooling line and configured to cool the first coolant; and
a second radiator disposed along the second cooling line and configured to cool the second coolant,
wherein a first temperature of the first coolant that has passed through the first radiator is higher than a second temperature of the second coolant that has passed through the second radiator, and a third temperature of the first coolant that has passed through the heat exchanger is lower than the first temperature.

8. A fuel cell system for a vehicle, the fuel cell system comprising:
a first cooling line configured to pass through a fuel cell stack in the vehicle and to circulate a first coolant therethrough;
a second cooling line configured to pass through a power electronic part in the vehicle and to circulate a second coolant therethrough;
a heat exchanger configured to allow the first coolant and the second coolant to exchange heat;
a first radiator disposed along the first cooling line and configured to cool the first coolant;
a second radiator disposed along the second cooling line and configured to cool the second coolant,
a first connection line comprising one end connected to the first cooling line between an outlet of the first radiator and an inlet of the fuel cell stack, and a second end connected to the first cooling line between an outlet of the fuel cell stack and an inlet of the first radiator;
a heater disposed along the first connection line and configured to heat the first coolant flowing along the first connection line; and
a second connection line configured to pass through an air conditioning unit in the vehicle and to circulate the first coolant therethrough, the second connection line being connected to the first cooling line between the outlet of the first radiator and the inlet of the fuel cell stack.

9. The fuel cell system of claim 1, wherein the power electronic part comprises one or more of:
a bi-directional high-voltage DC-DC converter disposed between the fuel cell stack and a high-voltage battery of the vehicle;
a blower pump control unit configured to control a blower configured to supply outside air for operating the fuel cell stack;
a low-voltage DC-DC converter configured to convert a high direct-current voltage into a low direct-current voltage; and
an air compressor configured to compress air to be supplied to the fuel cell stack, and an air cooler.

* * * * *